United States Patent [19]

Buell et al.

[11] Patent Number: 5,205,572
[45] Date of Patent: Apr. 27, 1993

[54] CYCLE REAR SUSPENSION SYSTEM

[75] Inventors: Erik F. Buell, Mukwonago; Marc Muller, Waterford, both of Wis.

[73] Assignee: Schwinn Bicycle Company, Chicago, Ill.

[21] Appl. No.: 750,648

[22] Filed: Aug. 27, 1991

[51] Int. Cl.$^5$ .................. B60G 15/00; B62K 25/04
[52] U.S. Cl. .................................................. 280/284
[58] Field of Search ............... 280/283, 284, 285, 288; 267/171

[56] References Cited

U.S. PATENT DOCUMENTS

| | | | |
|---|---|---|---|
| 1,130,828 | 3/1915 | Kuehn | 280/284 |
| 1,412,012 | 4/1922 | Bruno | 280/284 |
| 2,132,317 | 10/1938 | Pease | 280/284 |
| 2,283,671 | 5/1942 | Finlay et al. | 280/284 |
| 2,446,731 | 8/1948 | Wheler | 280/284 |
| 3,942,821 | 3/1976 | Bock | 280/277 |
| 3,948,543 | 4/1976 | MacDonald et al. | 280/284 |
| 4,039,200 | 8/1977 | McGonegle | 280/284 |
| 4,046,396 | 9/1977 | Taylor et al. | 201/214 |
| 4,058,181 | 11/1977 | Buell | 180/32 |
| 4,186,936 | 2/1980 | Offenstadt et al. | 280/277 |
| 4,421,337 | 12/1983 | Pratt | 280/277 |
| 4,433,850 | 2/1984 | Miyakoshi et al. | 280/277 |
| 4,568,101 | 2/1986 | Bleustein et al. | 280/707 |
| 4,679,811 | 7/1987 | Shuler | 280/284 |
| 4,732,404 | 3/1988 | Coetzee | 280/283 |
| 4,789,174 | 12/1988 | Lawwill | 280/284 |
| 4,792,150 | 12/1988 | Groendal et al. | 280/275 |
| 4,815,763 | 3/1989 | Hartmann | 280/276 |
| 4,997,197 | 3/1991 | Shultz | 280/275 |
| 5,000,470 | 3/1991 | Kamler et al. | 280/275 |
| 5,014,808 | 5/1991 | Savard et al. | 180/219 |

FOREIGN PATENT DOCUMENTS

| | | |
|---|---|---|
| 155582 | 3/1954 | Australia . |
| 497017 | 2/1919 | France ................... 280/284 |
| 923235 | 7/1947 | France . |
| 2395879 | 3/1979 | France . |
| 421518 | 5/1947 | Italy . |
| 423515 | 7/1947 | Italy . |
| 540821 | 3/1956 | Italy . |
| 17336 | 10/1913 | United Kingdom . |
| 24918 | 9/1918 | United Kingdom . |

Primary Examiner—Mitchell J. Hill
Attorney, Agent, or Firm—McCaleb, Lucas & Brugman

[57] ABSTRACT

A rear suspension system for a two wheel cycle such as a bicycle or motorcycle having a main frame which includes a rearwardly or downwardly inclined down tube. A vertically pivotable rear frame assembly includes a pair of swing arms which extend rearwardly from pivotal connections on the main frame. Rear wheel fitments are carried by the swing arms. A pair of elongated flexible tubelike or rodlike chain stays extend forwardly from the rear fitments at a fixed angle relative to the swing arms. A tubular shock absorber assembly is supported on the down tube and has a spring urging a coupler portion thereof in a forward and upward direction. A bell crank assembly, pivotally connected to the underside of the frame, connects the chain stays to the coupler portion of the shock absorber assembly. Upward impacts on the rear wheel are reacted on the main frame as a downward and rearward force with a largely downward force component so pitching motion at the rear end of the main frame is minimized when moving over ground or highway irregularities or rough terrain encountered in off road riding. In one embodiment, the shock absorber assembly is supported on the forward side of the down tube; in another embodiment, the shock absorber assembly is inside an open rear ended down tube.

33 Claims, 10 Drawing Sheets

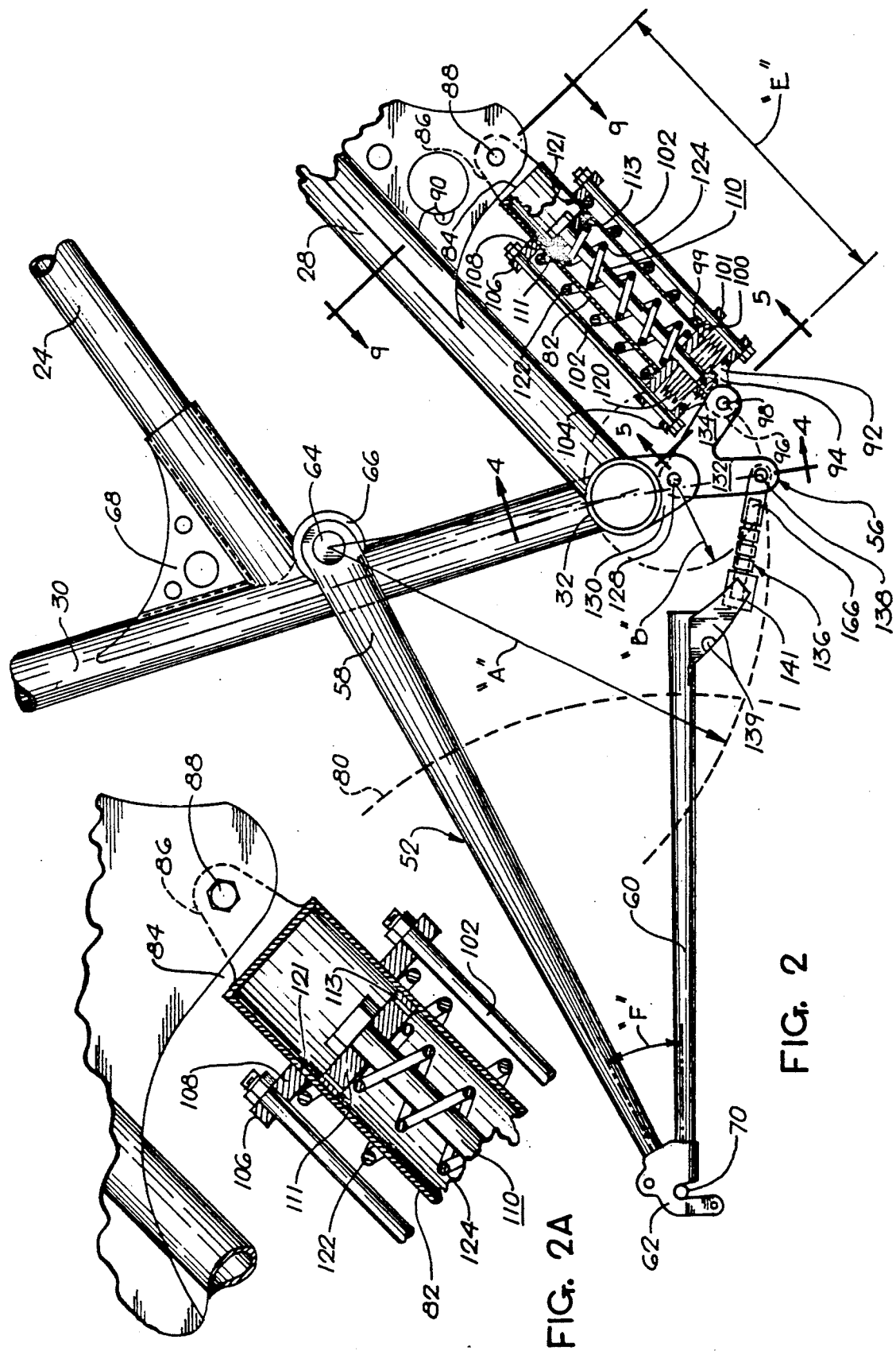

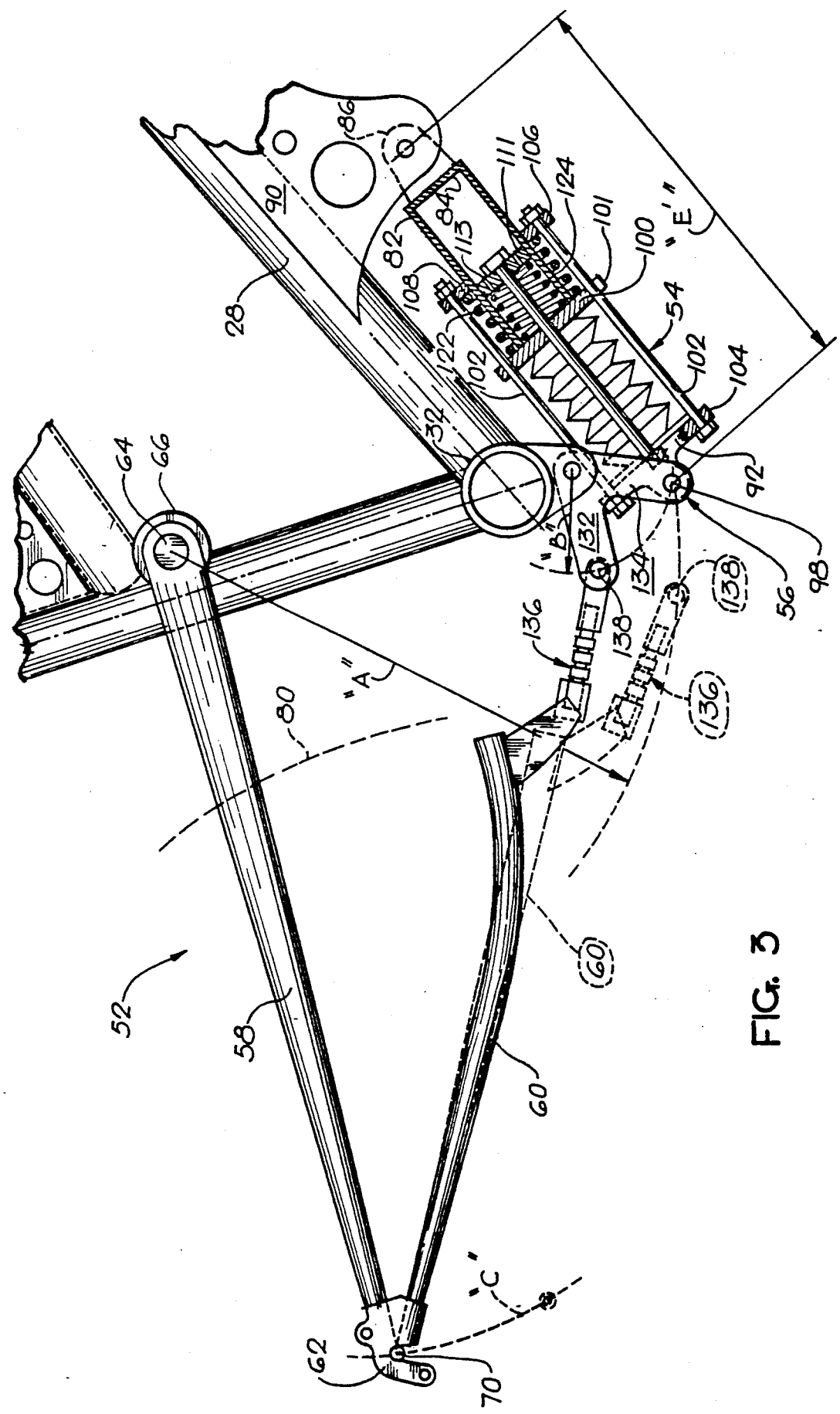

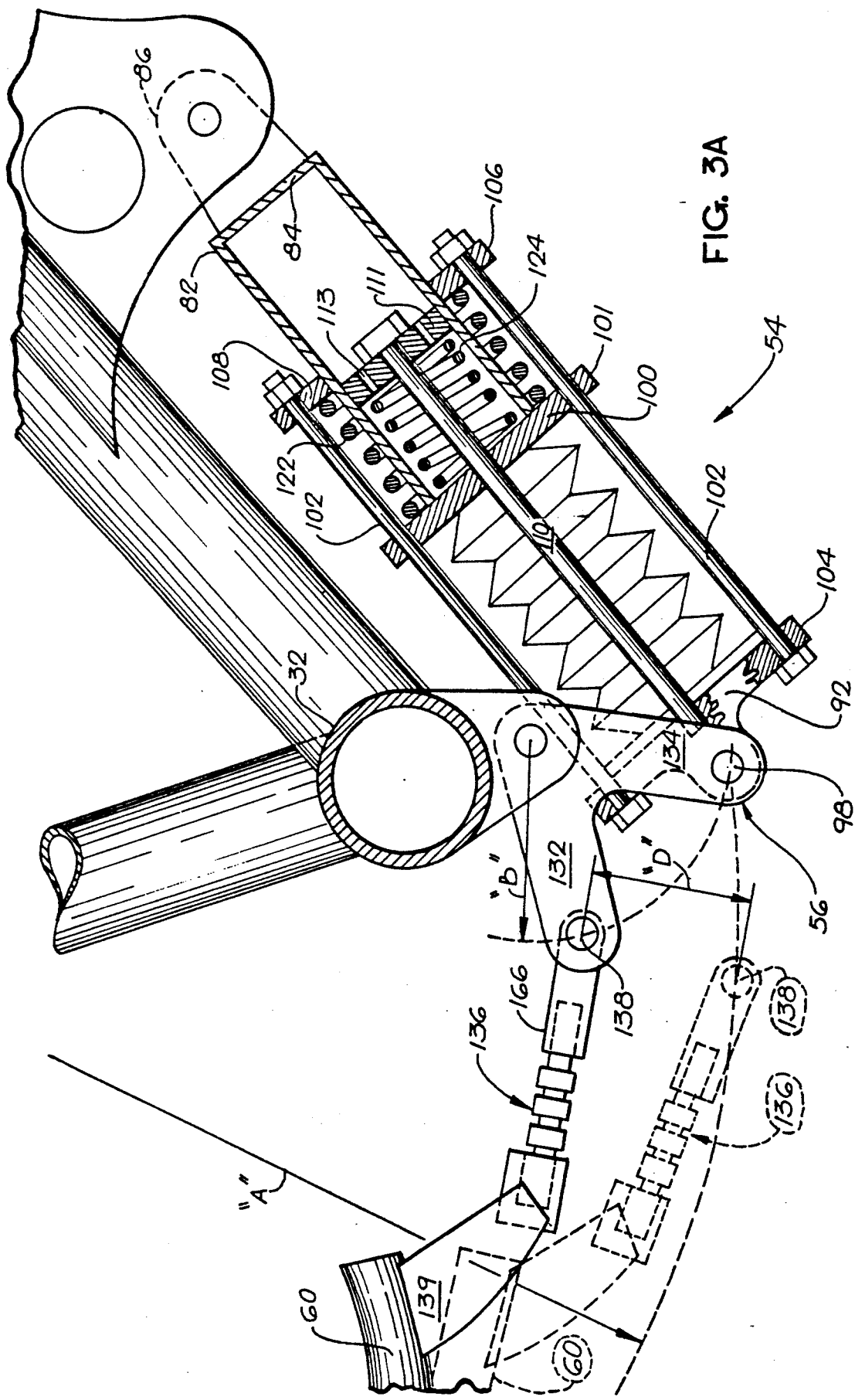

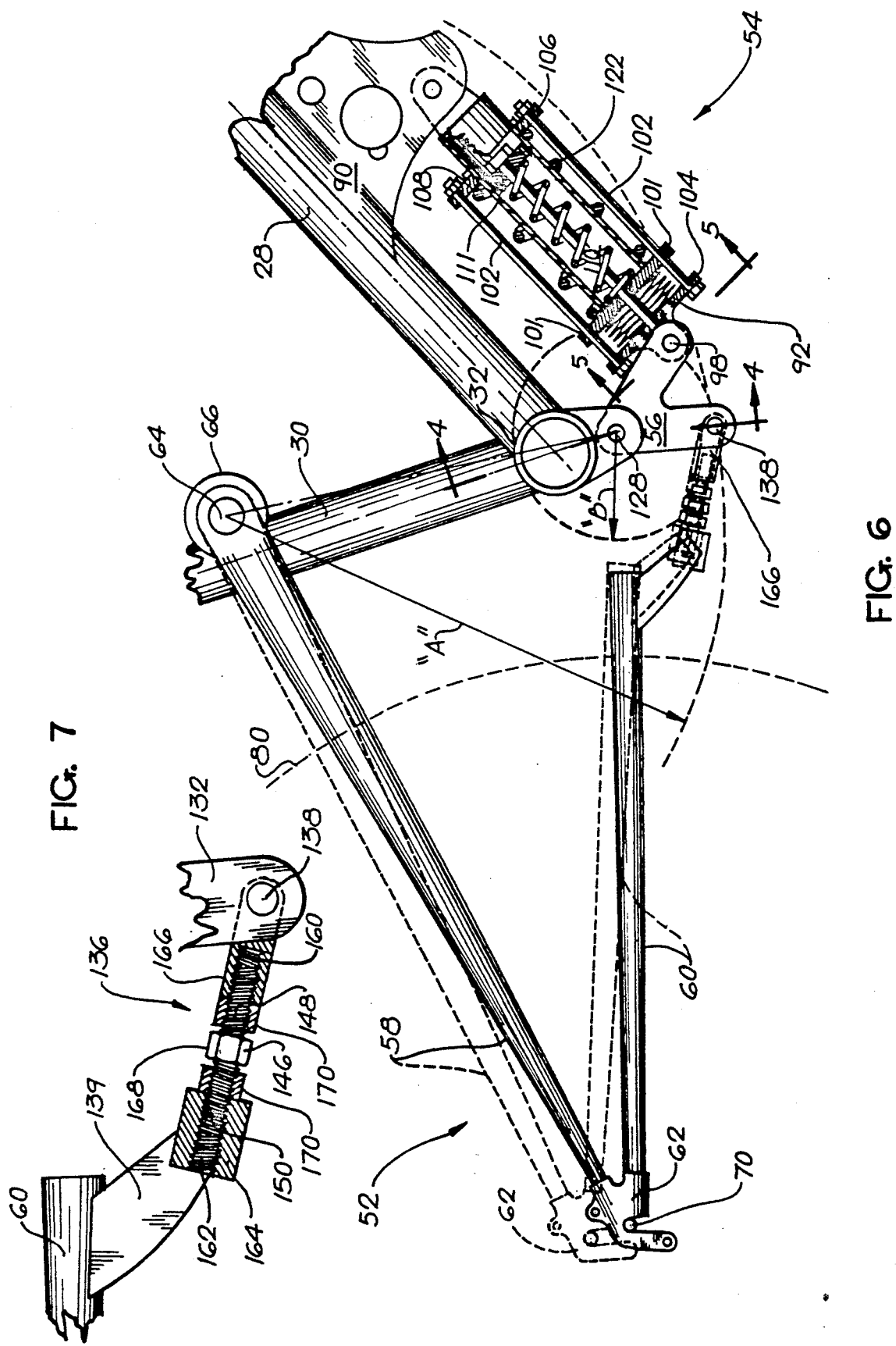

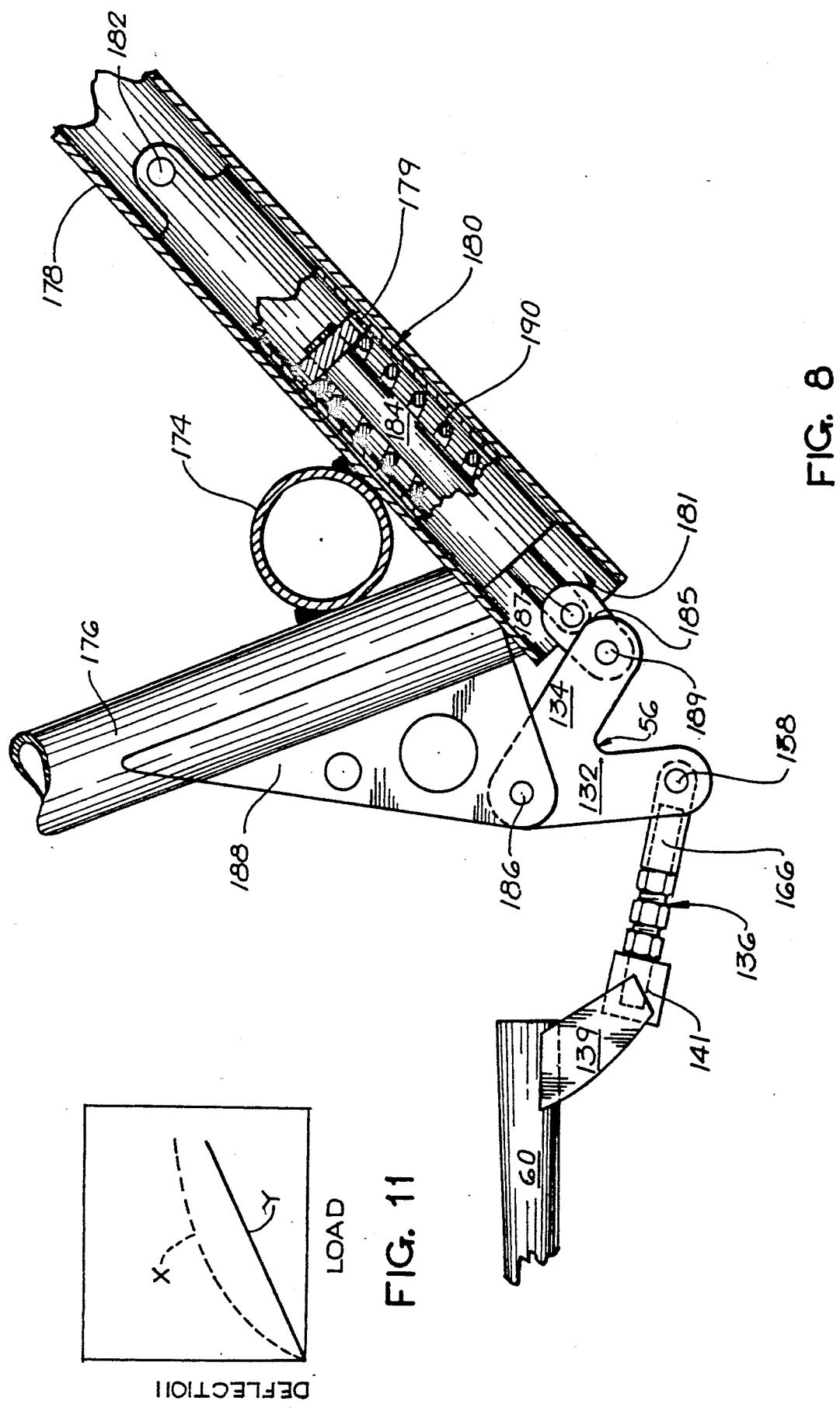

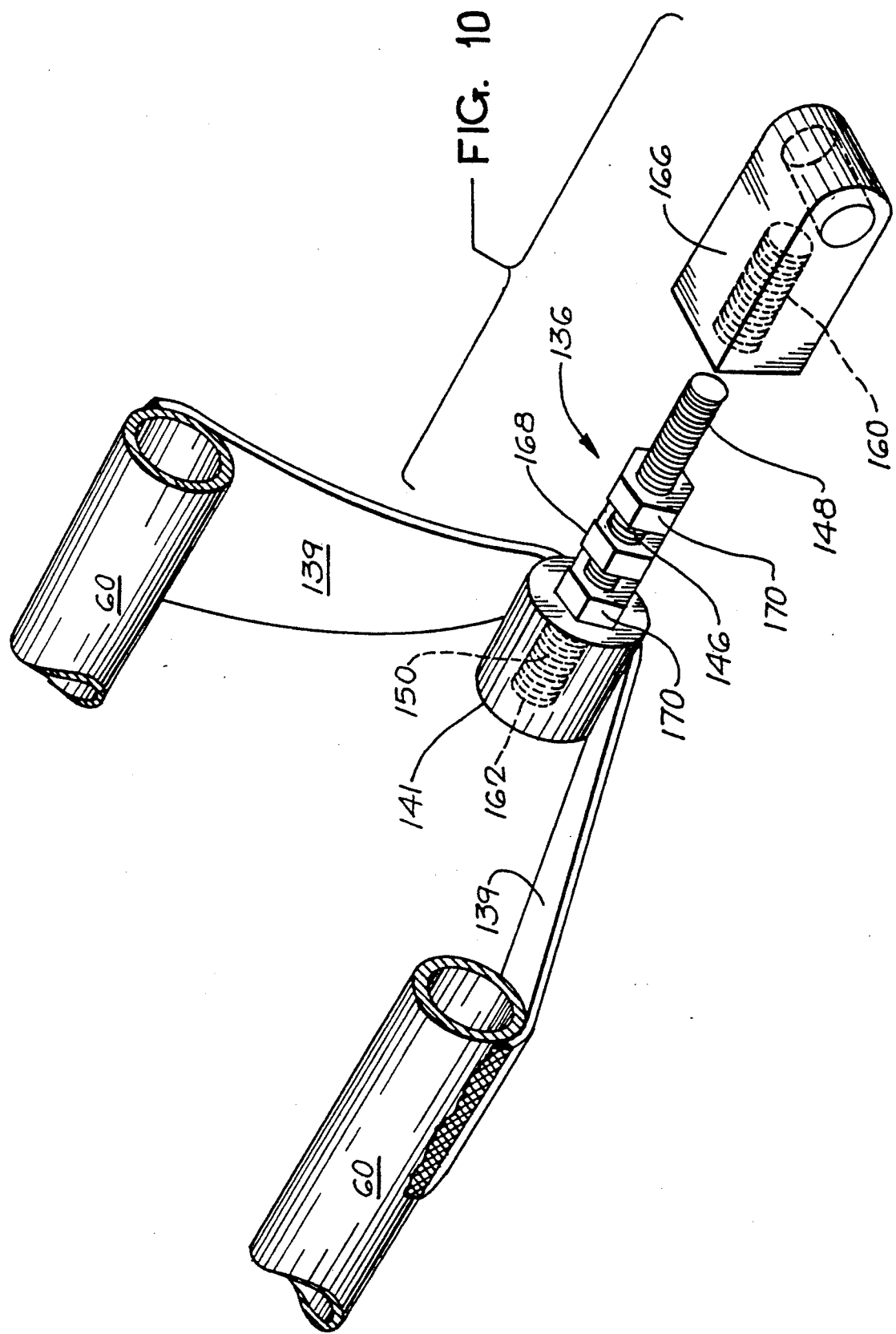

CYCLE REAR SUSPENSION SYSTEM

BACKGROUND OF THE INVENTION

Bicycles and motorcycles were originally built with rigid frames; As the horsepower, weight and speed of motorcycles increased, and they began to be used off road, both front and rear wheel suspensions were developed and have now reached a very high degree of sophistication. Today, the best motorcycle suspensions are exotic and highly effective combinations of oil dampers, compressed gas and steel springs, and elastopolymers with individual tuning adjustments for rebound and compression damping to optimize shock absorption for different weight riders and different riding conditions.

Although soft ride bicycle suspensions and components have been around for almost 100 years, mostly in experimental and show bikes, none have been manufactured in any significant quantities. Riders and manufacturers have resisted the added weight, cost, complexity and untraditional appearance of bicycles equipped with shock absorbing suspensions.

Recently, however, with the overwhelming popularity of mountain bikes, and off road riding and racing, the idea of equipping bicycles with soft ride suspensions has aroused wide interest. Riding a fully soft-suspended mountain bike down a rough, rock-strewn trail, or even level riding on city and country roads, demonstrates a new degree of safety and comfort. Downhill riding and racing can be speeded up with increased safety. On ordinary city and country roads, the rider can look forward to more safely view and react to traffic and road conditions ahead without paying disproportionate attention to stones and potholes immediately below. As examples of intense current interest in soft ride suspensions for bicycles, the entire February 1991 issue of *Mountain Bike Action* has been devoted to shock absorbing bike suspensions. Among other articles, there is a feature article with a complete comparison of what it describes as "The Seven Best New Suspension Bikes" plus many pages of miscellaneous information on soft ride suspensions and advantages thereof. *Bicycling* for April 1991 pages 84–98 has a feature article on shock absorbing suspensions entitled, "New Bicycle Suspensions".

SUMMARY OF THE INVENTION

The invention is an improved rear wheel suspension system, especially beneficial on mountain bikes but also useful on two wheel cycles generally including street and highway bicycles, and motorbikes. The system permits higher speed operation over rough terrain especially in downhill racing, with improved control. Upward impact on the rear wheel is reacted to the main frame in a very special way resulting in a largely downward force component, so that pitching motion at the rear end of the main frame is greatly reduced when moving over rough, off road terrain as well as the normal bumps and potholes encountered in street and highway riding.

Structurally, this suspension system has a tubular shock absorber assembly supported by the down tube. The shock absorber assembly has a load receiving coupler which is movable downwardly and rearwardly against a spring. A pivotally mounted rear frame assembly supports the rear wheel. The rear frame assembly comprises a pair of rearwardly extending swing arms pivotally connected at their front ends to the main frame, and a pair of chain stays extending forwardly from the rear ends of the swing arms. Rear axle fitments are secured to the rear ends of the swing arms and corresponding chain stays on both sides. A bell crank assembly or equivalent connecting and guiding means is supported on the underside of the main frame and connects the front ends of the chain stays with the coupler on the shock absorber assembly. Upward momentary impact load on the rear wheel and rear frame assembly simultaneously deflects the shock absorber spring and bows the chain stays to resist the impact load with a unique progressive, variable spring rate which will be described.

Inasmuch as the shock absorber and its spring are mounted on or in the down tube, preferably generally parallel thereto, upward impact load on the rear wheel and rear frame assembly deflects the shock absorber spring in a largely downward direction thereby reacting the impact load as a largely downward component on the main frame so pitching motion at the rear end of the main frame is greatly reduced when riding over uneven terrain, rocks, pebbles and potholes.

The chain stays used in this invention are elongated metal or composite tubes or rods. They resist impact loads by acting as cantilever springs with a progressive deflection rate. That is, the deflection per unit of impact force is greater at the beginning of upward movement of the swing arms than at the end. The combination of bowable chain stays which act as variable rate spring means, and a linear shock absorber having fixed or variable rate coil spring means, provides the unique advantage of bobbing gently over small bumps at slow speeds but providing a firmer ride over larger bumps at higher speeds without ever bottoming at the end of the spring travel.

BRIEF DESCRIPTION OF THE DRAWINGS

Other objects and advantages will be apparent from the accompanying drawings in which

FIG. 2 is a fragmentary enlarged view of FIG. 1 showing the rear suspension system in an unloaded or a very lightly loaded position;

FIG. 2A is an enlarged, fragmentary view of FIG. 2;

FIG. 3 is a view similar to FIG. 2 showing a loaded, impact-absorbing position;

FIG. 3A is a fragmentary enlarged view of FIG. 3;

FIG. 6 is a view similar to FIG. 2 showing adjustment of the rear suspension system for different size riders; FIG. 6 also shows in broken lines an example of initial upward deflection resulting from a rider's weight;

FIG. 7 is a fragmentary enlarged cross sectional view of an adjustment link shown in FIGS. 2, 3 and 6;

FIG. 8 is a fragmentary view similar to FIG. 1 showing an alternative embodiment of the invention;

FIG. 10 is a fragmentary, enlarged perspective view of FIG. 2;

FIG. 11 is a graph with curves comparing the load/deflection characteristics of two types of springs used in the present invention.

Like parts are indicated by like reference numerals.

DESCRIPTION OF THE PREFERRED EMBODIMENT

Figure 1:
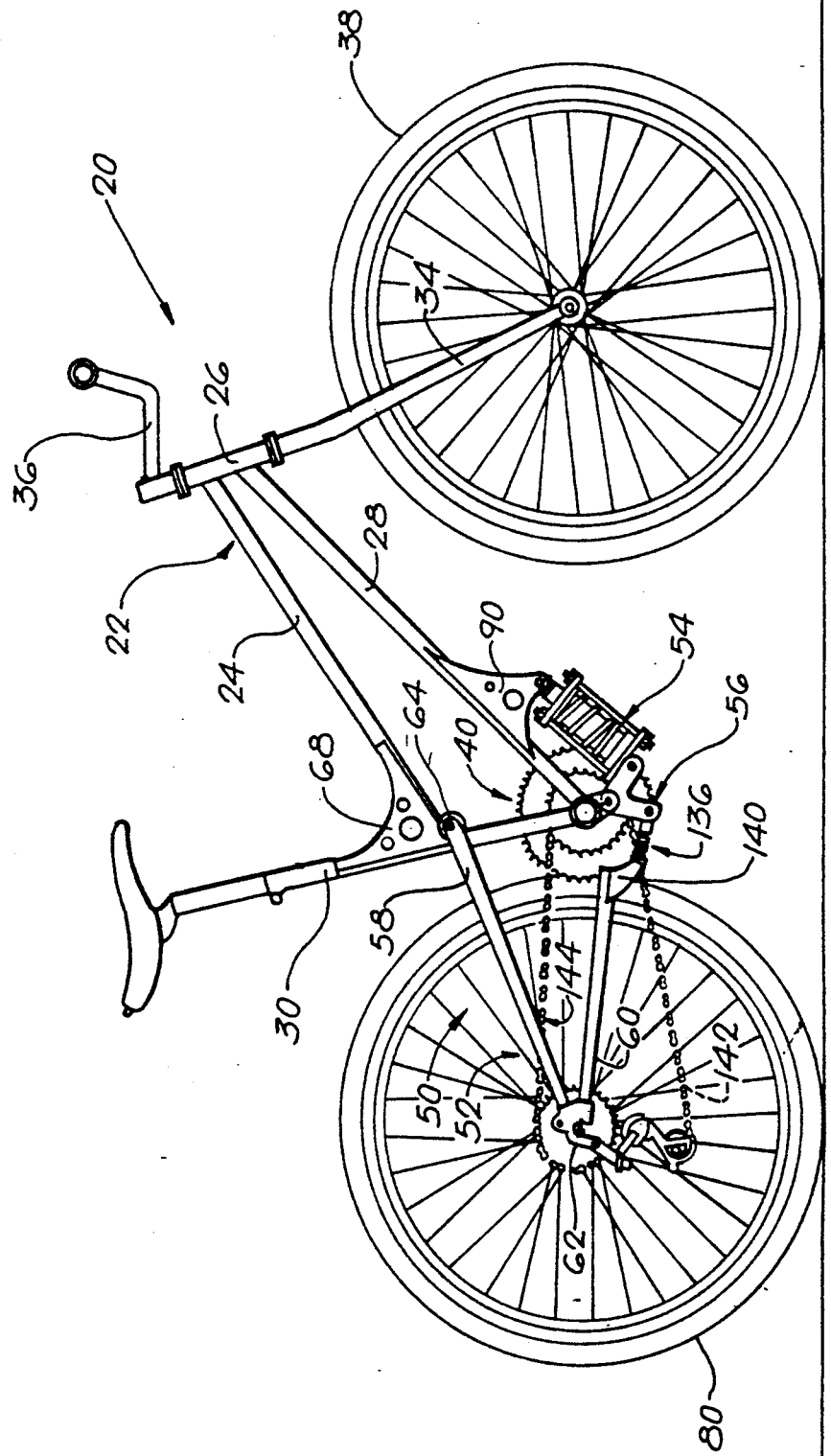
FIG. 1 is a right side elevational view of a bicycle incorporating a rear suspension system illustrating a preferred form of the present invention.

Referring now in more detail to the embodiment shown in FIGS. 1-7, 8 and 9 a bicycle generally designated 20 incorporates a preferred form of the present invention.

The bicycle 20 has a main frame 22 including an inclined top tube 24, a head tube 26, a down tube 28, a seat tube 30, and a bottom bracket shell 32. Fitted to the main frame are conventional components including a front fork 34, handlebar 36, front wheel 38, and a pedal and front sprocket assembly 40.

The soft ride rear suspension system of this invention is generally designated 50 and comprises a pivotal rear frame assembly 52, a shock absorber assembly comprising fluid-damped piston and cylinder means 54, and connecting and guiding means 56. The rear frame assembly 52 comprises a pair of swing arms 58, a pair of transversely flexible rod like chain stays or longitudinal struts 60, and rear fitments 62 which will now be described.

As best shown in FIGS. 1, 2 and 3, the rearwardly extending swing arms 58 are pivotally connected at their front ends to the opposite sides of the main frame. They are swingable up and down about a pivot pin 64 extending through a bearing housing 66 which is welded to the seat tube 30 which in turn is welded to a triangular bracket 68 secured as by welding to the seat tube 30 and top tube 24. The bracket 68 strengthens the seat tube 30 to resist bending of the unsupported length above the junction with the top tube 24. Each swing arm 58 has at its rear end a corresponding one of the rear fitments 62 for a rear axle 70 of a rear wheel 80. This supports the rear wheel and rear frame assembly 52 for up and down shock absorbing swinging motion about the pivot pin 64 relative to the main frame 22.

Figure 9:
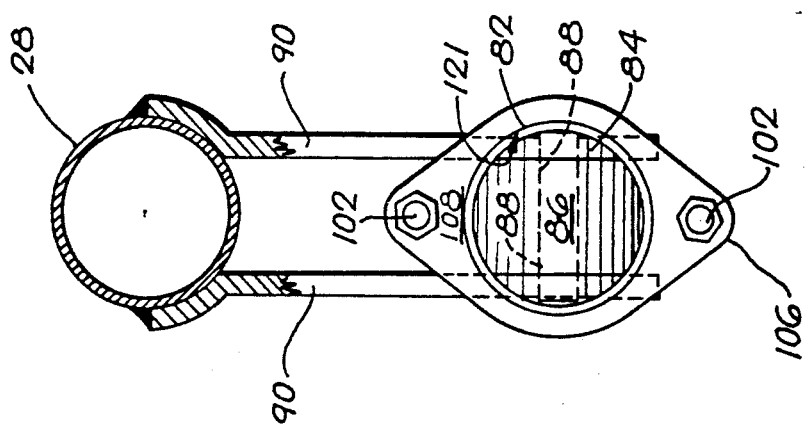
FIG. 9 is a cross sectional view of FIG. 2 taken along line 9—9.

The tubular shock absorber assembly 54 is mounted along the forward edge of the down tube 28. Any form of shock absorber may be used. The invention does not require any particular type. As shown in FIGS. 2, 3 and 9, the shock absorber assembly comprises a cylindrical body 82 closed at the top, forward end by an upper end cap 84 which has an upwardly and forwardly directed axial extension 86 pivotally mounted on a pin 88 extending between a pair of brackets 90, 90 secured as by welding to the forward side of down tube 28. At the rear, lower end, best shown in FIGS. 2 and 5, an external coupling means generally designated 94 is movable in opposite directions for receiving and damping impact forces generated by movements of the rear frame assembly. The coupling means comprises a transverse lower plate 92 having a rearward, downward draw bar extension 96 with a transverse pin 98 providing a pivotal connection to the connecting and guiding means 56 which comprises a bell crank to be described.

A lower cap 100 seals the bottom end of cylinder 82. A pair of external tie bolts 102, 102 extend through diametrically opposed ears 104 and 106 on the lower plate 92 and an upper plate 108 respectively. The bolts are slidably guided within openings 99 in ears 101 on the lower cap 100. A piston 111 with dampening apertures 113 (FIG. 2A) or any other suitable dampening means to regulate the flow of liquid or gas through the piston is supported on a piston rod 110. The apertures 113 and the piston 111 comprise means for dampening movement of the coupling means 94 by limiting or controlling the speed of the piston 111. This dampening movement of the coupling means absorbs impact loads applied to the rear frame assembly by the rear wheel. Piston rod 110 is threadedly secured in lower plate 92. The fluid medium in the cylinder may be hydraulic or gas or a combination thereof. A bellows 120 extends between the lower plate 92 and lower cap 100 to act as a dust cover for the exposed portion of piston rod 110. Upper plate 108 has a central opening 121 (FIG. 9) through which the cylinder 82 is journaled for relative axial movement.

Figure 2B:
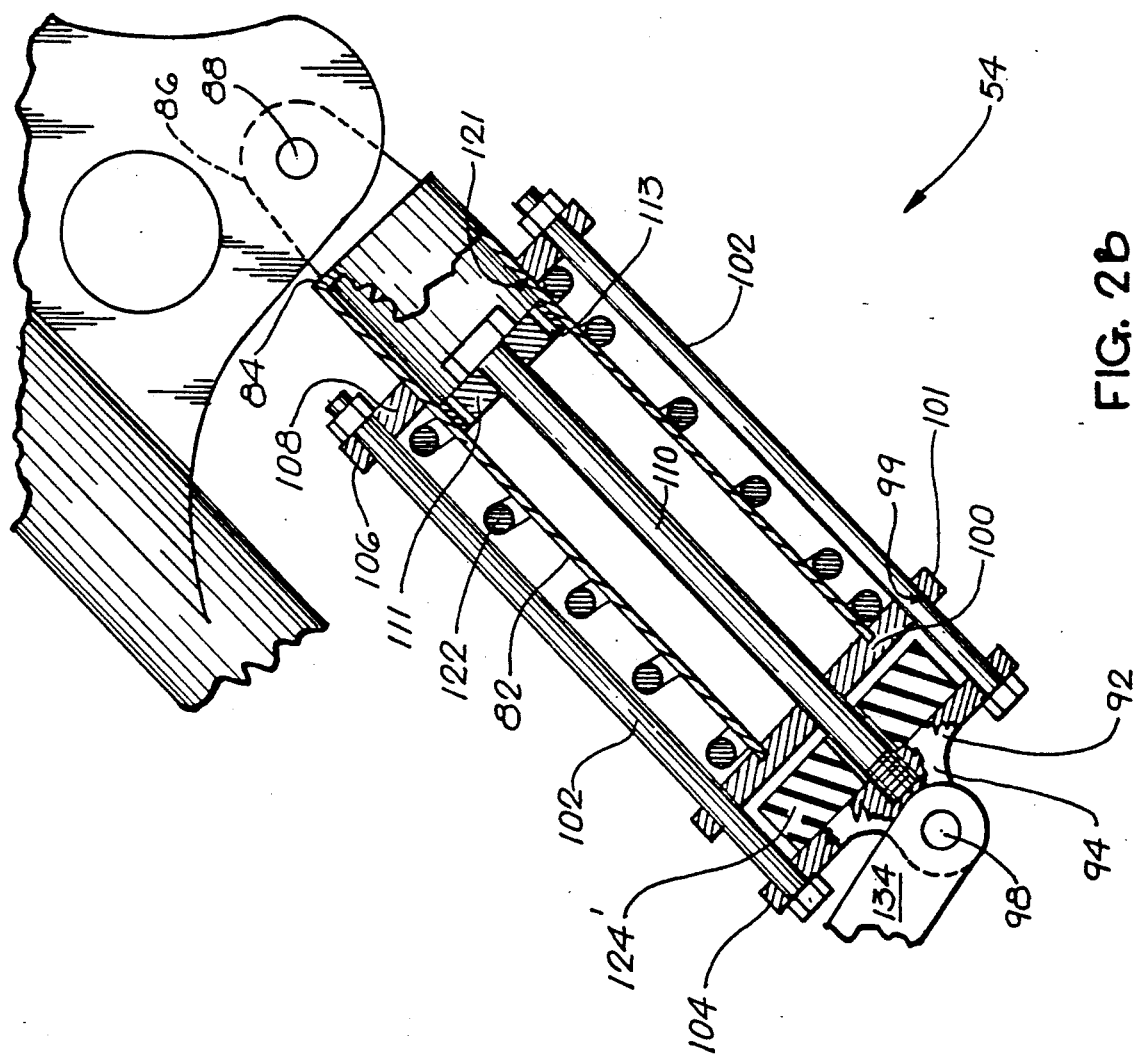
FIG. 2B is a fragmentary enlarged view similar to FIG. 2, showing a modified form of shock absorber with a rubber bumper instead of an inner spring bumper.

A main spring 122 is provided externally of the cylinder 82, inside the tie bolts 102. This spring is compressibly interposed between the upper plate 108 and lower cap 100. An auxiliary, anti-bottoming compression coil spring 124 may be provided internally of the cylinder 82 but is not essential. Alternatively, an annular, rubberlike bumper 124' may be positioned between the lower plate 92 and lower cap 100, instead of the inner spring 124, as shown in FIG. 2B. Preloading of main spring 122 is provided by adjusting the lengths of tie bolts 102.

Figure 5:
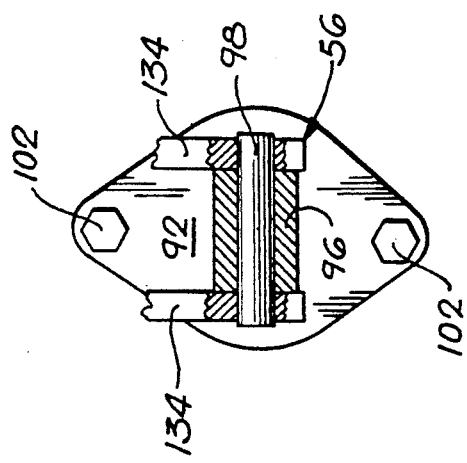
FIGS. 4 and 5 are fragmentary enlarged cross sectional views of FIG. 2 taken along lines 4—4 and 5—5 respectively.
Figure 4:
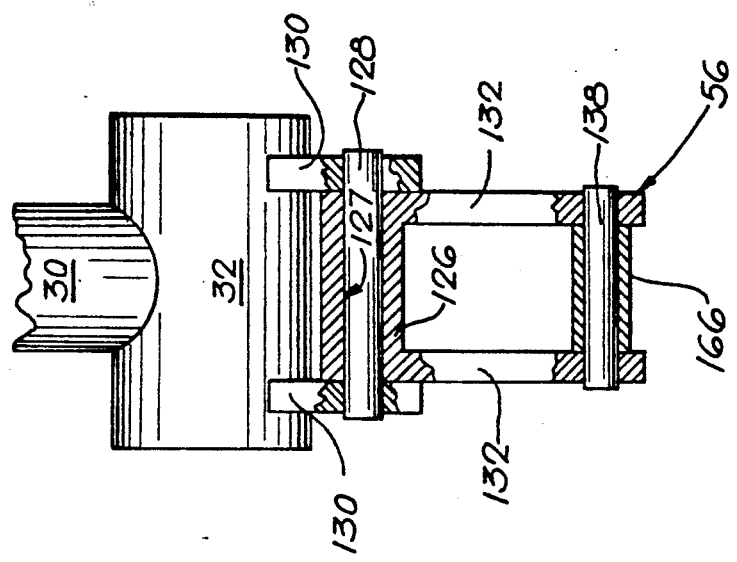
Figure 12:
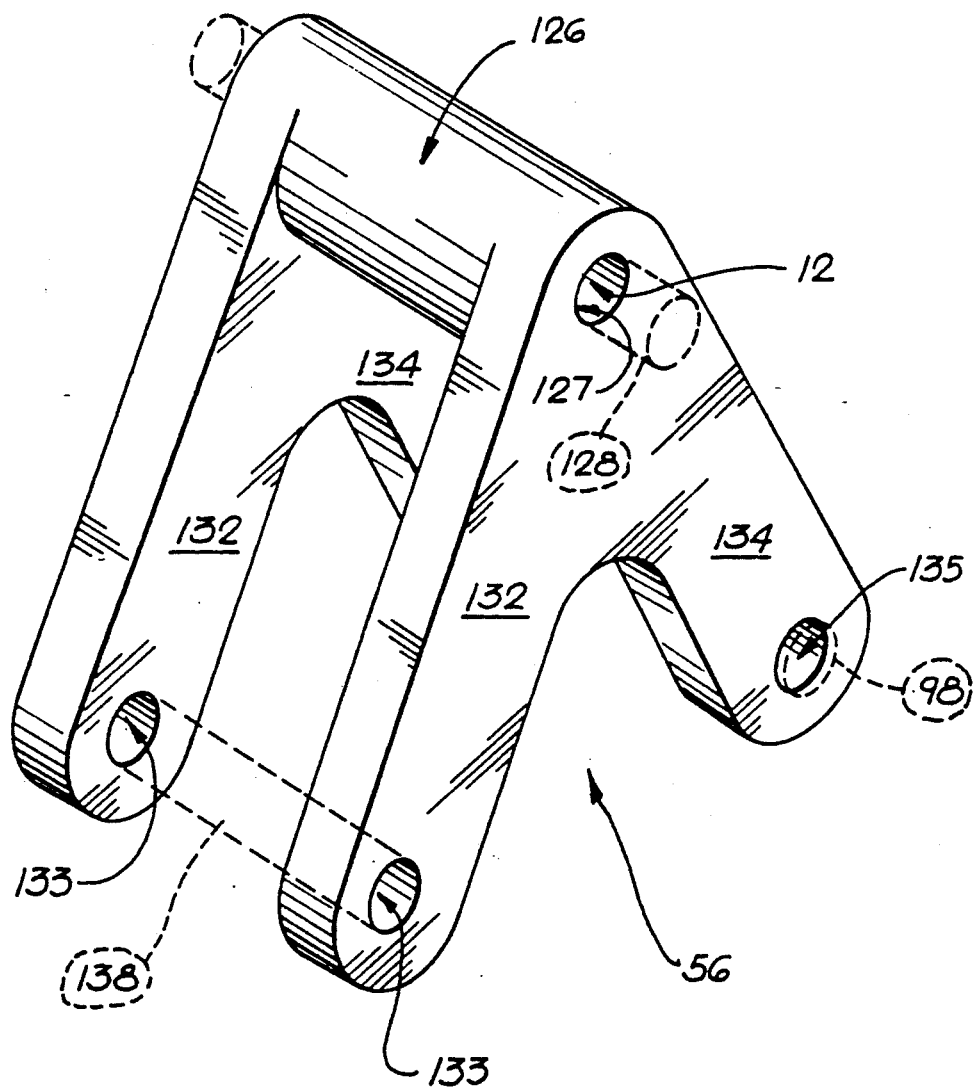
FIG. 12 is an enlarged, perspective view of a bell crank employed in the invention.

The connecting and guiding means generally designated 56 comprises a bell crank at the bottom of the main frame connected between the shock absorber assembly 54 and the pivotable rear frame assembly 52. As best shown in FIGS. 2, 4, 5 and 12, the bell crank 56 has a transverse, central or apex portion 126 with a bore 127 pivoted on a pin 128 to a corresponding bracket 130 on the bottom bracket shell 32. As best shown in FIG. 12, the bell crank 56 has two pairs of angularly divergent arms 132 and 134 forming an integral unit with transverse central portion 126. Arms 134, 134 have bores 135 which are pivotally connected to the opposite sides of shock absorber draw bar extension 96 by pin 98 (FIGS. 2, 5 and 12). Arms 132, 132 have bores 133 and are pivotally connected to the opposite sides of adjustment link 166 by a pin 138 (FIGS. 2, 4 and 8).

As stated, the pivotable rear frame assembly 52 includes a pair of chain stays 60, 60. These are transversely flexible longitudinal struts. They comprise longitudinal, rod-like members such as tubes or rods or struts of metal or of a suitable resilient or elastic composite material. They are secured as by welding, solder, or adhesive to the corresponding rear fitments 62 at each end of the rear axle 70. There is a predetermined, fixed angle F (FIG. 2) between each swing arm 58 and corresponding chain stay 60.

As best shown in FIGS. 1 and 2, the chain stays 60 are longitudinal strut members generally L-shaped, each having a transversely offset dog leg portion generally designated 140 to clear the lower reach 142 of the drive chain 144, and enable the chain stays to deflect elastically when under an impact load. Each chain stay 60 is a transversely flexible rod-like member with the rear portion transversely offset from the forward portion 136 to provide clearance for a rear wheel drive chain (not shown). As best shown in FIG. 10, the dog leg portion comprises a pair of offset brackets 139 secured by welding between the chain stays 60 and a socket member 141 having internal threads 162. The link 136 connects the socket member 141 at the forward end of the chain stay assembly to the bell crank arms 132, 132. Referring to FIG. 10, the link 136 comprises an adjustment bolt 146 with opposite-hand threads in sections 148 and 150 engaging internal threads 160 and 162 in the connector 166 and socket 141 respectively. The adjustment link bolt 146 has a wrench-engageable center hex section 168. Locknuts 170, 170 hold a selected adjustment. As shown in FIG. 10, the dog leg brackets 139 and the socket member 141 comprise a fork interconnecting the chain stay tubes 60, 60 into a solid, elastic assembly, with a progressive, variable spring rate to be described.

The adjustment bolt linkage 136 can be rotated in one direction or the other to raise or lower the rear frame assembly by moving it between the solid line and broken line positions shown in FIG. 6. This adjusts the rear suspension system to accommodate different size riders. An alternative embodiment in which a long, thin shock absorber assembly is positioned within a rear-open-ended down tube is shown in FIG. 8. In this embodiment, a bottom bracket shell 174 is secured as by welding between a seat tube 176 and an open-bottomed down tube 178. A shock absorber assembly 180 is anchored at its upper forward end within the down tube by a bolt 182. A rearwardly and downwardly extending coupler or piston rod 184 extends through the open rear end 181 of the down tube and is connected via bell crank 56 and adjustment linkage 136 to chain stays 60 in the manner described in connection with the previous embodiment. In the embodiment shown in FIG. 8, a link 185 is pivotally connected between pivot pins 187 and 189 on the coupler 184 and bell crank arm 134, respectively, to compensate for their different directions of movement. The bell crank 56 in FIG. 8 is pivotally mounted on a pin 186 which is secured between a pair of brackets 188 welded on the back side of seat tube 176. Main spring 190 engages the underside of piston 179 and urges the piston rod 184 upwardly and forwardly and functions in the manner described for main spring 122 in shock absorber assembly 54.

An important relationship is shown in FIGS. 2 and 3. Note that an arc A struck from the center of swing arm pivot pin 64 coincides with arc B struck from the pivot anchor pin 128 of bell crank arms 132 at the pin connection 138 only in the unloaded position of FIG. 2.

When a rider strikes a sudden elevation, the upward impact load exerted by rear axle 70 swings the rear suspension upwardly to some position such as that illustrated in FIG. 3. Note, in FIG. 3, that connecting pin 138 follows arc B upwardly along a line that diverges substantially from the line generated by arc A. This causes the chain stays to be bowed as illustrated, being bowed more and more as the rear axle moves upwardly more and more. The solid line representation of the chain stay 60 in FIG. 3 shows it upwardly concave, and with the maximum deflection at pin 138 to show the cantilever character of the bending. The broken line representation of the chain stays in FIGS. 3 and 3A shows the position they would occupy if pin 138 were disconnected from the bell crank. As one example, in a prototype of this invention, the radius of Arc "A" was 10-5/32" and the radius of Arc "B" was 3-5/16". The distance between the centers of axle 70 and pin 138 was approximately 1/16" more in FIG. 3 than in FIG. 2, thereby bowing the chain stays. When the rear axle 70 was deflected upwardly a distance C equivalent to about four inches, as shown in FIG. 3, the chain stays were deflected sufficiently that the distance D between the broken line and solid line representations of pin 138 was approximately one inch. At the same time, the length of the shock absorber assembly increased from E=6" in FIG. 2 to E'=8.0" in FIG. 3. The bowing deflection in FIG. 3 is purposely exaggerated in the drawing to illustrate the bending direction and the cantilever bending principle involved.

When the chain stays bow elastically in this manner, they flex with a progressive, variable, increasing rate as shown by curve X in the load/deflection graph in FIG. 11. This is in contrast to the constant load/deflection rate for the shock absorber coil springs 122 and 124, and 190, which is shown by curve Y in FIG. 11. For example, an initial 50 pound downward load on the seat tube may bow the chain stays initially so the deflection D is one-eighth inch. But with the seat tube already loaded, say, with 150 pounds, an additional 50 pounds might bow it only an additional few hundredths of an inch. By bringing the chain stays into action as progressive, variable rate springs, supplementing the resistance exerted by the constant rate shock absorber main coil spring 122 (or 190 in the embodiment shown in FIG. 8), the rear suspension will flex softly under light impacts, and more firmly in smaller and smaller increments with larger and larger impacts. This enables the suspension to react softly with light impacts and firmly with heavier impacts, without ever bottoming except under the most severe impacts which will be absorbed by the inner spring 124 or the elastic bumper 124'.

Use and operation are believed apparent from the preceding detailed description. Briefly, assume first that the bicycle is not loaded or is only very lightly loaded and the rear suspension initially takes the configuration shown in FIGS. 1 and 2. The main shock absorber spring 122 is only lightly compressed and the chain stays 60, 60 are substantially straight as illustrated in FIG. 2.

Next, assume a rider mounts the bicycle. His weight causes the rear frame assembly 52 to deflect upwardly to a position somewhere between the positions shown in FIGS. 2 and 3, for example to the broken line position shown in FIG. 6 with the chain stays 60 slightly bowed and the main shock absorber spring slightly compressed.

Now assume the rear wheel strikes a substantial bump such as a brick lying in the roadway, or a pothole or curb. The heavy impact drives the rear axle 70 upwardly a distance to the position shown in FIG. 3 with the rear end of the swing arms 58 and chain stays 60 displaced upwardly corresponding amounts. The impact load is absorbed by the concurrent compression of main spring 122 and bowing of the chain stays as shown in FIG. 3. The rate of upward movement of the piston rod 110 and draw bar 96, and downward rebound are damped by piston orifices 113.

While particular examples of the present invention have been shown and described, changes and modifications may be made without departing from the basic invention. Accordingly, the aim of the appended claims is to cover all such changes and modifications which are included within the spirit and scope of the invention.

The embodiments of the invention in which an exclusive property or privilege is claimed are defined as follows:

1. A rear suspension system for a cycle having a main frame with a seat supporting member located forwardly of a rear wheel, said suspension system comprising:

a pivotable rear frame assembly including elongated swing arm means for supporting a rear wheel for up and down movement relative to the main frame and being pivotally connected at its front end portion to the main frame and having means at its rear end portion for supporting a rear wheel for up and down movement relative to the main frame, said rear frame assembly also including elongated, forwardly extending chain stay means for controlling movement of the swing arm means and having a rear end portion thereof connected to the rear end portion of the swing arm means and movable therewith and having a forward end portion extending forwardly toward the main frame;

a shock absorber assembly comprising elongated fluid-damped piston and cylinder means located forwardly of the seat supporting member and supported at one end by the main frame and having coupling means at the other end movable in opposite directions for receiving and dampening impact forces generated by movements of the rear frame assembly;

spring means urging said coupling means in one direction; and connecting and guiding means supported by the main frame connecting the forward end portion of the chain stay means with the coupling means to move the coupling means in a direction opposite said one direction against the urgence of the spring means in response to upward pivotal movement of the rear frame assembly, said connecting and guiding means enabling the spring means to move the coupling means in said one direction in response to downward pivotal movement of the rear frame assembly.

2. A rear suspension system according to claim 1 in which the connecting and guiding means is movable with the rear frame assembly and with the coupling means.

3. A rear suspension system according to claim 1 in which the connecting and guiding means is a movable member pivotally connected respectively to the chain stay means and the coupling means.

4. A rear suspension system according to claim 1 in which the connecting and guiding means is a bell crank pivotally mounted to the bottom of the main frame.

5. A rear suspension system according to claim 1 in which the elongated chain stay means comprises transversely flexible rod-like members rigidly angularly disposed relative to the swing arm means, whereby energy from a momentary impact load on the rear frame assembly is absorbed by a concurrent bending of said flexible rod-like members and deflection of said spring means.

6. A rear suspension system according to claim 5 in which the transversely flexible rod-like members comprise rear and forward end portions and the rear end portion is upwardly offset from the forward end portion to facilitate clearance with respect to a chain driving the rear wheel.

7. A rear suspension system according to claim 1 in which said main frame includes a down tube with a rearward opening and said shock absorber assembly and spring means are disposed inside the down tube with said coupling means extending from said opening.

8. A rear suspension system according to claim 1 including means for adjusting the length of the chain stay means to adjust the height of the rear frame assembly for different size riders.

9. A rear suspension system according to claim 1 in which said shock absorber assembly is supported on the main frame with said coupling means being movable along an axis having a substantial vertical component, and said spring means urges said coupling means in an upward direction along said axis;

whereby an upward, momentary impact load on the rear frame assembly displaces it upwardly and deflects the spring means in a largely downward direction while said impact load is reacted through said spring means as a largely downward force component on the main frame, to resist upward movement of the main frame in response to said momentary impact load.

10. A rear suspension system according to claim 1 in which said main frame has a seat tube and both said shock absorber assembly and said spring means are located forwardly of the seat tube to maximize clearance for a rear wheel rearwardly of the seat tube.

11. A rear suspension system according to claim 1 in which said main frame has a forwardly and upwardly inclined down tube and said shock absorber assembly and said spring means are supported on the main frame with said coupling means being movable along an axis which is generally parallel to the down tube.

12. A rear suspension system for a cycle, said cycle having a main frame including a rearwardly and downwardly extending down tube, a generally upright seat tube, and a bottom bracket shell, said suspension system comprising:

a pivotable rear frame assembly behind the main frame including elongated swing arm means for supporting a rear wheel for up and down movement relative to the main frame and being pivotally connected at its front end portion to the main frame, the swing arm means having means at the rear end portion for supporting a rear wheel for up and down movement relative to the main frame, said rear frame assembly also including elongated chain stay means extending forwardly from the rear end portion of the swing arm means and being movable therewith for controlling movement of the swing arm means;

a shock absorber assembly supported by the main frame alongside the down tube and having a coupling means which is movable along an axis generally parallel to the down tube for applying a load from the swing arm means to the shock absorber assembly, said shock absorber assembly including spring means urging said coupling means in one direction along the down tube, and means for dampening movement of said coupling means; and connecting and guiding means connecting the chain stay means with the coupling means on an underside of the main frame;

whereby an upward impact load on the rear frame assembly displaces it upwardly and deflects the spring means in a direction opposite said one direction, and whereby further, movement of the rear frame assembly is dampened.

13. A rear suspension system according to claim 12 in which the elongated chain stay means comprises at least one transversely flexible rod-like member which is fixedly angularly disposed relative to the swing arm means, whereby energy from an upward impact load on the rear frame assembly is absorbed by bending of the flexible rod-like member in addition to deflection of the spring means.

14. A rear suspension system according to claim 13 in which the transversely flexible rod-like member includes transversely offset forward and rear portions to provide clearance relative to a drive chain for the rear wheel.

15. A rear suspension system according to claim 12 in which the connecting and guiding means has flexible connections with the chain stay means and the coupling means.

16. A rear suspension system according to claim 12 in which the connecting and guiding means is pivotally connected between the chain stay means and the coupling means.

17. A rear suspension system according to claim 16 in which the connecting and guiding means is flexibly connected to the main frame.

18. A rear suspension system according to claim 16 in which the connecting and guiding means is flexibly connected to the underside of the bottom bracket shell.

19. A rear suspension system according to claim 12 in which the connecting and guiding means is a bell crank pivoted respectively to the main frame respectively to the chain stay means and, the coupling means.

20. A rear suspension system according to claim 12 in which the down tube has a rearwardly open end, the shock absorber assembly is disposed therein, and the coupling means extends from said rearwardly open end.

21. A rear suspension system according to claim 16 in which the connecting and guiding means is pivotally connected to the main frame.

22. A rear suspension system according to claim 16 in which the connecting and guiding means is pivotally connected to the bottom bracket shell.

23. A rear suspension system for a cycle, said cycle having an upright main frame including a down tube, a seat tube, and a bottom bracket shell, said main frame having opposite sides, said suspension system comprising:
- a pair of rearwardly extending swing arms pivotally connected at their front ends to said opposite sides of said main frame, each swing arm having at its rear end a rear fitment adapted to support a rear wheel for up and down movement relative to the frame;
- a tubular shock absorber assembly supported by the down tube and having a linearly movable coupling means extending rearwardly and downwardly therefrom for applying a load from the swing arm means to the shock absorber assembly, said shock absorber assembly including spring means urging said coupling means in a forward and upward direction, and means dampening movement of said coupling means in either direction;
- a pair of elongated flexible chain stays, each extending forwardly from a corresponding one of said rear fitments; and
- bell crank means having the apex thereof pivotally mounted on the underside of the frame and having two angularly spaced arms pivotally connected respectively to the forward ends of the chain stays and to said coupling means;
- whereby upward movement of the chain stays with the swing arms moves the coupling means of the shock absorber assembly through the bell crank means and such movement is resisted by longitudinal deflection of the spring means and by transverse deflection of the chain stays, whereby movement of said swing arms is dampened in both up and down directions, and whereby further upward force on said swing arms is reacted through said spring means and chain stays as a largely downward force on the frame.

24. A rear suspension system according to claim 23 in which the chain stays have transversely offset front and rear portions to clear a drive chain connected to drive the rear wheel.

25. A rear suspension system according to claim 24 in which the chain stays comprise transversely flexible longitudinal struts.

26. A rear suspension system according to claim 23 in which the shock absorber assembly is supported on the main frame along the forward side of the down tube.

27. A rear suspension system according to claim 23 in which the down tube has a rearwardly open end, the shock absorber assembly is disposed therein and the coupling means thereof extends from said rearwardly open end.

28. A rear suspension system according to claim 23 in which the swing arms and chain stays are connected to corresponding rear fitments at a fixed angle.

29. A rear suspension system for a cycle having a main frame with a seat supporting member located forwardly of a rear wheel and with a forwardly and upwardly inclined down tube, said suspension system comprising:
- a pivotable rear frame assembly behind the main frame including elongated swing arm means for supporting a rear wheel for up and down movement relative to the main frame being pivotally connected at its front end to the main frame and having means at the rear end for supporting a rear wheel, said rear frame assembly also including elongated chain stay means extending forwardly from the rear end of the swing arm means and being movable therewith for controlling movement of the swing arm means;
- a shock absorber assembly comprising elongated, fluid-damped piston and cylinder means supported at one end by the down tube forwardly of the seat supporting member and having coupling means at the other end linearly movable in opposite directions along the down tube for receiving and dampening impact loads applied to the rear frame assembly;
- spring means urging said coupling means in one direction; and
- bell crank means pivotally mounted respectively to the underside of the main frame, to the coupling means, and to the chain stay means, a toggle link pivotally connected between the bell crank means and the coupling means to maintain a positive connection between the bell crank means and the coupling means throughout a range of pivotal movement of the bell crank means and corresponding linear movement of the coupling means;
- whereby an upward impact load on the rear frame assembly displaces it upwardly and deflects the spring means in a direction opposite said one direction, and whereby further, movement of the rear frame assembly is dampened.

30. A rear suspension system according to claim 29 in which the chain stay means comprises transversely flexible rod means, said rod means being rigidly angularly disposed relative to the swing arm means, whereby energy from a momentary impact load on the rear frame assembly is absorbed by a concurrent bending of said flexible rod means and deflection of said spring means.

31. A rear suspension system according to claim 29 in which said down tube has a rearward opening and said shock absorber assembly and spring means are disposed inside the down tube with said coupling means extending through said opening.

32. A rear suspension system according to claim 29 in which opposite end of said toggle link are pivotally connected respectively to the bell crank means and to the coupling means.

33. A rear suspension system for a cycle having a main frame with a forwardly and upwardly inclined down tube, said suspension system comprising:
- a vertically movable rear frame assembly having means for supporting a rear wheel, and means connecting the rear frame assembly to the main frame for up and down movement relative to the main frame;
- a shock absorber assembly comprising elongated, fluid-damped piston and cylinder means supported at one end by the main frame and having coupling means at the other end movable in opposite directions along the down tube for receiving and dampening impact forces generated by movements of the rear frame assembly;
- spring means urging said coupling means in an upward direction; and
- a bell crank pivotally connected respectively to the main frame, to the rear frame assembly, and to the coupling means enabling the coupling means to be movable downwardly against the urgence of the spring means in response to upward movement of the rear frame assembly, and said bell crank enabling the spring means to move the coupling means upwardly in response to downward movement of the rear frame assembly;
- whereby an upward, impact load on the rear frame assembly displaces the rear frame assembly upwardly and deflects the coupling means in a largely downward direction while the impact load is reacted through said spring means as a largely downward force component on the main frame, and whereby further, movement of the rear frame assembly relative to the main frame is damped.

* * * * *

UNITED STATES PATENT AND TRADEMARK OFFICE
CERTIFICATE OF CORRECTION

PATENT NO. : 5,205,572
DATED : 4/27/93
INVENTOR(S) : Erik F. Buell & Marc Muller It is certified that error appears in the above-identified patent and that said Letters Patent is hereby corrected as shown below:

Col. 3, line 28, delete "rod like" and insert -- rod-like --;

Col. 4, line 47, after "comprise" insert -- resilient --;

Col. 6, line 8, delete "elastrically" and insert -- elastically --;

Col. 9, line 22, delete -- respectively to --;

Col. 11, line 9, delete "end" and insert -- ends --.

Signed and Sealed this

Fifth Day of April, 1994

Attest:

BRUCE LEHMAN

*Attesting Officer*                *Commissioner of Patents and Trademarks*